United States Patent
Jaaskelainen et al.

(10) Patent No.: US 10,073,222 B2
(45) Date of Patent: Sep. 11, 2018

(54) FIBER OPTIC ROTARY JOINT CONNECTING DUAL-CORE FIBERS

(71) Applicant: Halliburton Energy Services, Inc., Houston, TX (US)

(72) Inventors: Mikko Jaaskelainen, Katy, TX (US); Ian Bradford Mitchell, Radford, VA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/022,402

(22) PCT Filed: Nov. 15, 2013

(86) PCT No.: PCT/US2013/070354
§ 371 (c)(1),
(2) Date: Mar. 16, 2016

(87) PCT Pub. No.: WO2015/073028
PCT Pub. Date: May 21, 2015

(65) Prior Publication Data
US 2016/0209598 A1    Jul. 21, 2016

(51) Int. Cl.
*G02B 6/32* (2006.01)
*G02B 6/36* (2006.01)
(Continued)

(52) U.S. Cl.
CPC ....... *G02B 6/3604* (2013.01); *G02B 6/02042* (2013.01); *G02B 6/32* (2013.01); *G02B 6/0288* (2013.01)

(58) Field of Classification Search
CPC ...... G02B 6/3604; G02B 6/32; G02B 6/0288; G02B 6/02042
(Continued)

(56) References Cited

U.S. PATENT DOCUMENTS 5,039,193 A * 8/1991 Snow ............... G02B 6/262
                                                                    385/25
5,588,077 A   12/1996 Woodside
(Continued)

FOREIGN PATENT DOCUMENTS

JP    2000-269720 A    9/2000
JP    2000269720 A    9/2000
(Continued)

OTHER PUBLICATIONS

"International Application Serial No. PCT/US2013/070354, International Search Report dated Aug. 19, 2014", 3 pgs.
(Continued)

*Primary Examiner* — Akm Enayet Ullah
(74) *Attorney, Agent, or Firm* — Chamberlain Hrdlicka

(57) ABSTRACT

Aspects of the disclosure include an optical fiber sensing system and apparatus that provide for free rotation of fiber optic cables containing multiple cores. For example, the disclosure presents a fiber optic rotary joint, comprising a stator housing a non-rotating portion of a dual-core fiber optic cable and a rotor housing a rotating portion of the dual-core fiber optic cable. In such an example, the rotor is mounted to the stator to allow rotation of at least a portion of the rotor about at least a portion of the stator. Further provided is an optical fiber sensing system, comprising one or more multiplexor/demultiplexors configured to multiplex and demultiplex one or more signals, a dual-core fiber optic cable communicatively coupled to the multiplexor/demultiplexor and configured to carry one or more signals on an inner core and an outer core disposed about the inner core, and a dual-core fiber optic rotary joint.

6 Claims, 4 Drawing Sheets

(51) Int. Cl.
    *G02B 6/02*     (2006.01)
    *G02B 6/028*     (2006.01)

(58) Field of Classification Search
    USPC ............................... 385/14–16, 26–37, 147
    See application file for complete search history.

(56) References Cited

U.S. PATENT DOCUMENTS

| | | | | |
|---|---|---|---|---|
| 5,921,497 | A | * | 7/1999 | Utley, Jr. ........... B65H 75/4449 242/388.6 |
| 8,380,024 | B1 | * | 2/2013 | Zhang ................. G02B 6/3604 385/25 |
| 8,909,008 | B1 | * | 12/2014 | Tzeng ................. G02B 6/3604 385/25 |
| 2007/0217736 | A1 | * | 9/2007 | Zhang ................. G02B 6/3604 385/26 |
| 2011/0164846 | A1 | | 7/2011 | Zhang et al. |

FOREIGN PATENT DOCUMENTS

| | | |
|---|---|---|
| JP | 2009-271108 A | 11/2009 |
| JP | 2009271108 A | 11/2009 |
| JP | 2012-230193 A | 11/2012 |
| JP | 2012230193 A | 11/2012 |
| WO | WO-2015073028 A1 | 5/2015 |

OTHER PUBLICATIONS

"International Application Serial No. PCT/US2013/070354, Written Opinion dated Aug. 19, 2014", 7 pgs.

"F0300 Fiber Optic Rotary Joint", [online]. © 2013 Moog Inc. [archived on May 11, 2013]. Retrieved from the Internet: <URL: http://web.archive.org/web/20130511185214/http://www.moog.com/products/fiber-optic-devices/fiber-optic-rotary-joints/multi-channel-forj/fo300/>, (2013), 2 pgs.

"International Application Serial No. PCT/US2013/070354, International Preliminary Report on Patentability dated May 26, 2016", 9 pgs.

\* cited by examiner

FIBER OPTIC ROTARY JOINT CONNECTING DUAL-CORE FIBERS

PRIORITY APPLICATIONS

This application is a U.S. National Stage Filing under 35 U.S.C. 371 from International Application No. PCT/US2013/070354, filed on 15 Nov. 2013, and published as WO 2015/073028 A1 on 21 May 2015 which application and publication are incorporated herein by reference in their entirety.

BACKGROUND

The present disclosure is related to the field of optical fibers. Specifically, the disclosure relates to fiber optic rotary joints for dual-core fibers.

Optical fiber systems are often utilized for information transmission from a down-hole location during run-in-hole ("RIH") operations. It is common to stop during the RIH and manually connect to a fiber optic sensing cable to perform health checks of the fiber optic sensing systems. Ordinarily, this process involves stopping deployment, securing the reel, and manually connecting optical fibers to take a measurement. This process requires the deployment to be stopped and the rig placed into a standby period while the optical systems are being tested. This stoppage increases the operational and deployment costs of the system.

Oftentimes, where numerous downhole sensing systems exist, a single channel fiber optic rotary joint is insufficient to allow health checks of all the downhole fiber optic systems. Multi-channel fiber optic slip-rings are sometimes used in the field today to allow rotation of a cable with multiple fibers corresponding to multiple downhole systems. The large majority of these existing optical slip-rings are configured to house multiple single-channel fibers corresponding to multiple downhole systems often consist of complicated arrangements that exacerbate the problems associated with traditional sensing system performance. For example, periodic manual connections may still be needed with these multiple-fiber slip-ring systems, which, as stated above, drive up rig time and production costs. Thus, improved fiber optic rotary joints are needed for multi-system optical sensing applications.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The present disclosure presents example fiber optic rotary joints using dual-core fiber. The invention enables the use of both multi-mode and single-mode sensing systems simultaneously with minimum optical attenuation and thereby improving sensing system performance. Aspects of the disclosure include an optical fiber sensing system and apparatus that provide for free rotation of fiber optic cables containing multiple cores. For example, the present disclosure presents a fiber optic rotary joint, which includes a stator housing a non-rotating dual-core fiber optic cable and a rotor housing a rotating dual-core fiber optic cable. In an aspect of this example fiber optic rotary joint, the rotor is mounted to the stator to allow rotation of at least a portion of the rotor about at least a portion of the stator.

In an additional example, the present disclosure presents an optical fiber sensing system, which includes a multiplexor/demultiplexor configured to multiplex and demultiplex one or more signals, and a dual-core fiber optic cable communicatively coupled to the multiplexor/demultiplexor and configured to carry one or more signals on an inner core and an outer core disposed about the inner core. The example optical fiber sensing system may further include and a fiber optic rotary joint comprising a stator housing a non-rotating dual-core fiber optic cable and a rotor housing a rotating dual-core fiber optic cable, wherein the rotor is mounted to the stator to allow rotation of at least a portion of the rotor about at least a portion of the stator.

To the accomplishment of the foregoing and related ends, the one or more aspects comprise the features hereinafter fully described and particularly pointed out in the claims. The detailed description of the invention and the annexed drawings set forth in detail certain illustrative features of the one or more aspects. These features are indicative, however, of but a few of the various ways in which the principles of various aspects may be employed, and this description is intended to include all such aspects and their equivalents.

Figure 1A:
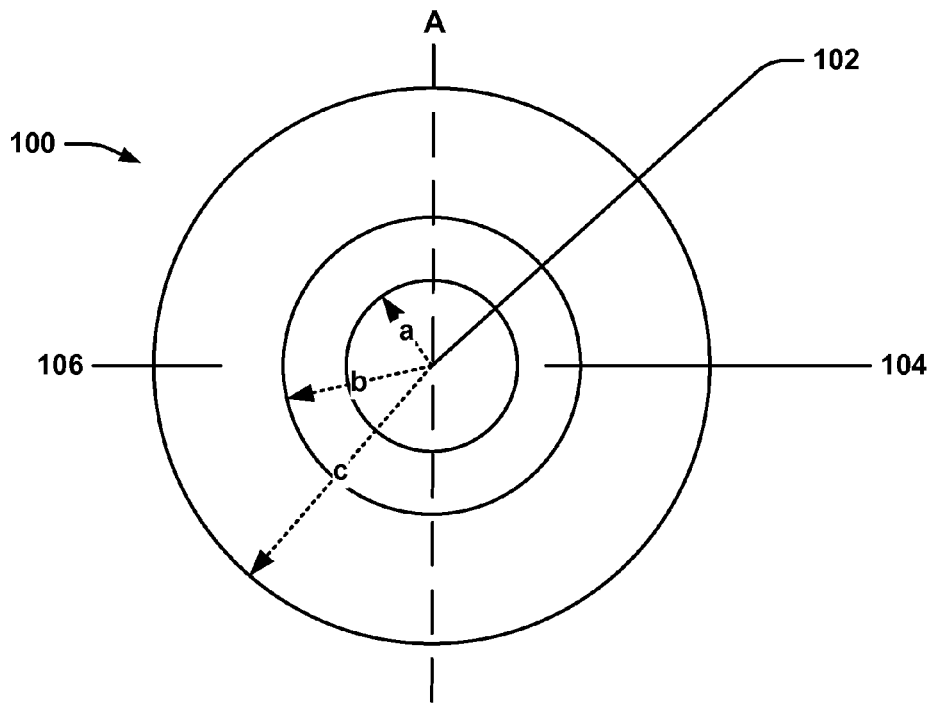
FIG. 1A depicts a horizontal cross-section of a dual-core fiber optic cable.
Figure 1B:
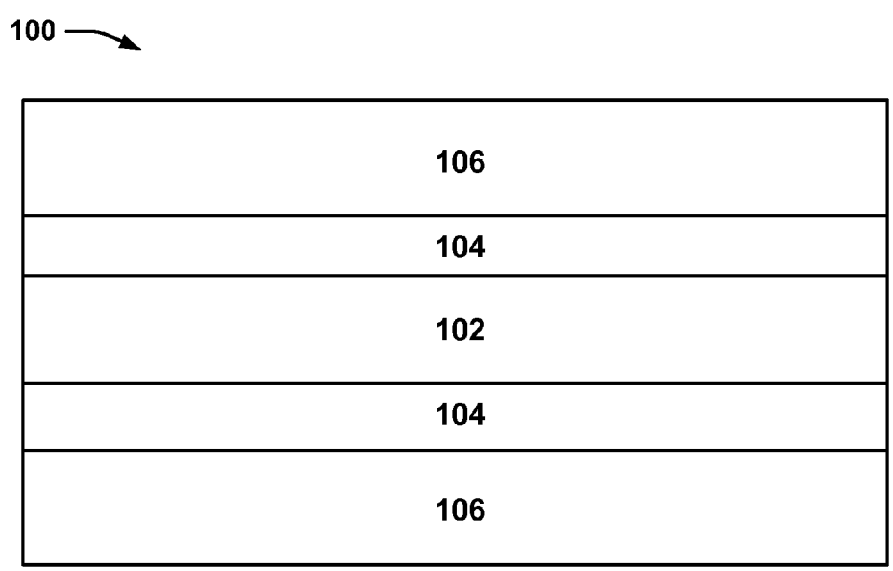
FIG. 1B depicts a vertical cross-section of a dual-core fiber optic cable.

FIGS. 1A and 1B illustrate an example dual-core fiber optic cable ("fiber") 100 according to the present disclosure. FIG. 1A represents a horizontal cross-section of the dual-core fiber 100, which includes an inner core 102, an outer core 104, and cladding 106 surrounding both the inner core 102 and outer core 104. In some examples, the inner core 102 is coaxially disposed within the outer core 104 and has a radius of distance a, which, in some examples may be about 0.1 micrometers to about 6 micrometers in length. Furthermore, the outer core 104 has an inner radius a and an outer radius b, with the outer core 104 comprising the region therebetween. In addition, the cladding 106 has an inner radius b and an outer radius c, with the cladding 106 comprising the region therebetween.

Additionally, in some examples, inner core 102 may comprise a single mode fiber core. A single mode fiber core is configured to carry a single mode, or light ray or pulse. Though carrying a single wave, however, single mode fibers may carry waves of multiple frequencies, but of the same mode. Compared to multi-mode fibers, single mode fibers exhibit relatively limited dispersion and exhibit a wider bandwidth. Furthermore, outer core 104 may comprise a multi-mode fiber. Multi-mode fibers are capable of carrying light waves of a plurality of modes. In addition, although certain examples of the present disclosure present inner core 102 as comprising a single mode fiber and outer core 104 comprising a multi-mode fiber, the opposite may be true in some examples. In other words, inner core 102 may comprise a multi-mode fiber and outer core 104 may comprise a single mode fiber.

Turning to FIG. 1B, the figure represents a vertical cross-section of dual-core fiber 100 along the line A of FIG. 1A. As shown, cladding 106 surrounds outer core 104, which surrounds inner core 102 in a coaxial fashion. Additionally, although the dual-core fiber 100 is shown in FIG. 1A and FIG. 1B as a coaxial cable with various core boundaries and thicknesses, it is to be appreciated that the radii and relative thicknesses of cladding 106, outer core 104, and inner core 102 may vary to realize desired optical properties of the dual-core fiber 100 for information transmission.

Figure 2:
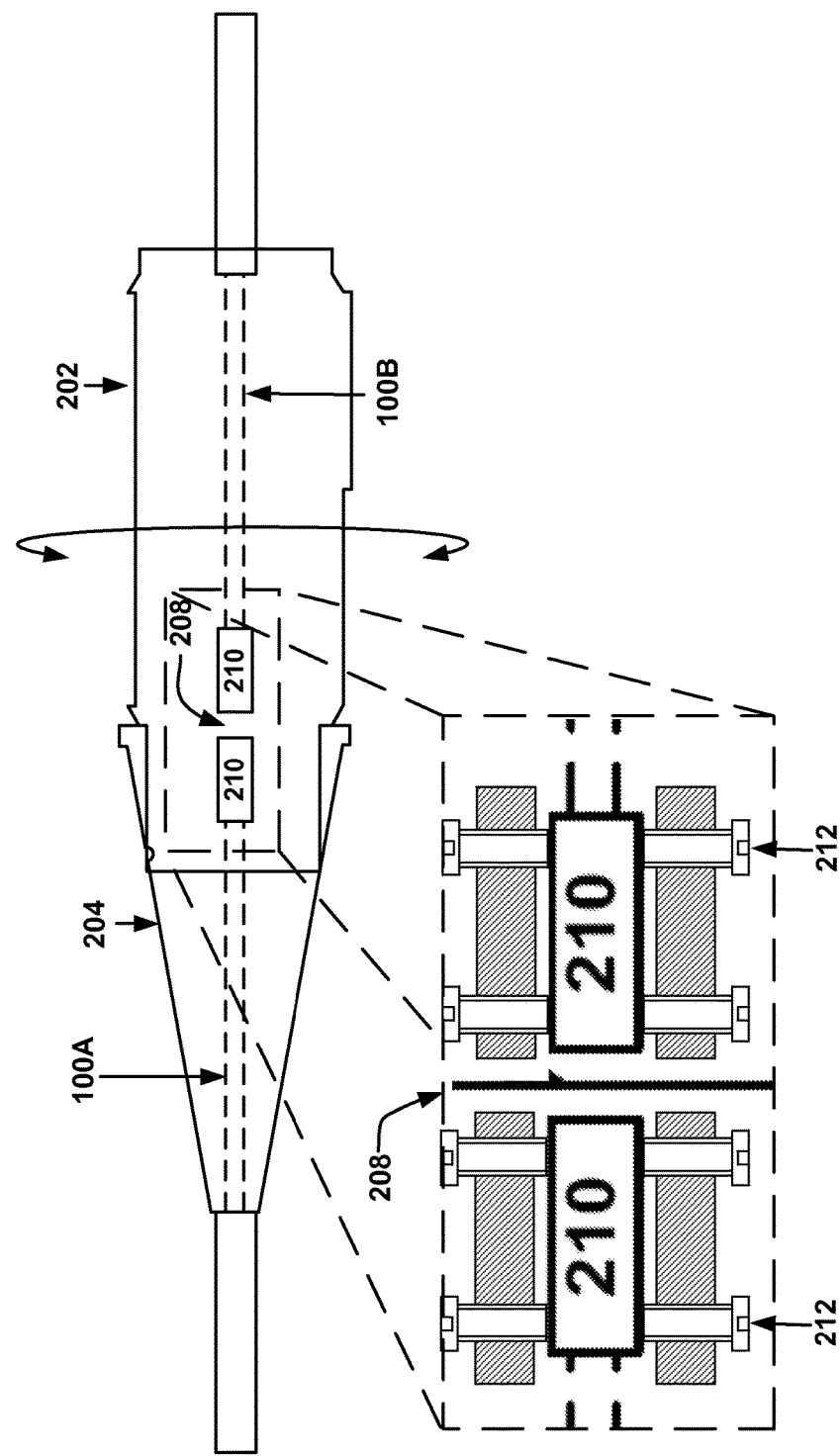
FIG. 2 depicts an example fiber optic rotary joint for dual-core fibers.

FIG. 2 represents a fiber optic rotary joint ("FORJ") 200, which is configured to allow rotation of dual-core fibers, for example, during operation of a running tool or other downhole tool with which the dual-core fibers are associated. In some examples, FORJ 200 may include a non-rotating stator 204, which may house a non-rotating dual-core fiber 100A. Additionally, FORJ 200 may include a rotor 202, which may be configured to rotate axially about the dual-core fiber axis. Furthermore, FORJ 200 may house a rotating dual-core fiber 100B. Rotor 202 and non-rotating stator 204 may be connected and may include components (e.g. bearings, spacers, etc.) that allow the rotor 202 to rotate about the non-rotating stator 204.

In addition, the ends of non-rotating dual-core fiber 100A and rotating dual-core fiber 100B may abut across a gap 208, which allows free axial rotation of rotating dual-core fiber 100B while maintaining alignment of the cores of the two dual-core fibers 100A, 100B across gap 208. To minimize signal loss across the gap 208, the inner and outer cores of rotating dual-core fiber 100B and non-rotating dual-core fiber 100A are aligned directly across the gap 208 from one another. However, because signal attenuation is proportional to any misalignment and gap 208 length, one or more lenses 210 may be placed at one or both of the ends of rotating dual-core fiber 100B and non-rotating dual-core fiber 100A to focus the light emanating from the dual-core fiber cores. For example, lenses 210 may include rod lenses, grated-index rod lenses, aspheric lenses, spherical lenses, expanded-beam lenses, or a combination thereof, which may be configured to transfer one or more light beams from rotating dual-core fiber 100B to non-rotating dual-core fiber 100A, or vice versa, across gap 208 with minimized signal attenuation due to the gap.

As shown within the enlarged portion of FIG. 2, in an embodiment, the lenses may comprise a pair of collimating lenses 210 disposed within a fiber ferrule or other suitable mechanical package. The fiber ferrule or other suitable mechanical package within which the pair of collimating lenses 210 is disposed may be disposed within the rotor 202 and the non-rotating stator 204. Further, the pair of collimating lenses 210 may be attached to alignment mechanisms 212 (e.g., set screws located 90-120 degrees apart radially, and some distance apart axially) to allow for alignment between the beams of rotating dual-core fiber 100B and non-rotating dual-core fiber 100A. The alignment mechanisms 212 may provide sufficient distance to allow optimization of the beam between the pair of collimating lenses 210 while maintaining alignment. For example, the distance of the gap between the ends of rotating dual-core fiber 100B to non-rotating dual-core fiber 100A may be a distance of about 0 to 2,000 microns (e.g., 0-2.0 millimeters). Further, the alignment mechanisms 212 may be coupled to or formed as an integral part of the rotor 202 and non-rotating stator 204 (not shown).

Figure 3:
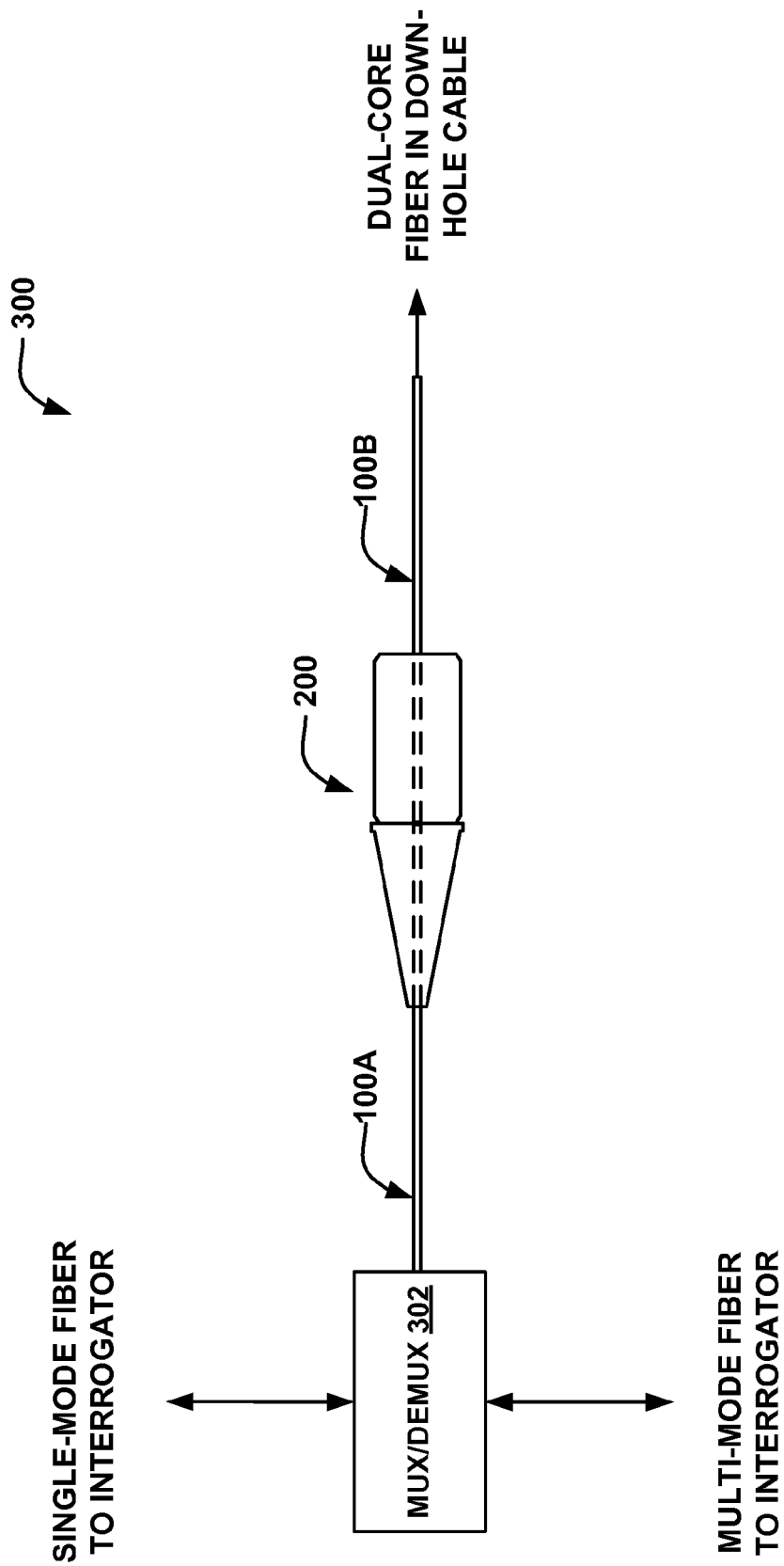
FIG. 3 depicts an example system utilizing a fiber optic rotary joint for dual-core fibers.

FIG. 3 illustrates a fiber optic communication system 300, which, in some examples, may be applied in downhole tool sensing and feedback systems. As shown, fiber optic communication system 300 may allow communication of signals via both a single mode fiber and a multi-mode fiber from a downhole location (and signals transmitted to a downhole location). In some examples, the single mode (SM) fiber pass can be used for Distributed Acoustic Sensing (DAS), single mode fiber optical time-domain reflectometer (OTDR) measurements, single mode Distributed Strain Sensing (DSS), fiber Bragg grating (FBG)-based sensors, Fabry-Perot based sensors or other single mode based sensing systems. The multi-mode (MM) fiber pass can be used individually or simultaneously for one or more of Distributed Temperature Sensing (DTS), multi-mode OTDR, multi-mode Frabry-Perot sensors, or other multi mode based optical sensors.

Furthermore, fiber optic communication system 300 may include one or more multiplexors and/or demultiplexors 302, which may be configured to separate, differentiate, or combine, as the case may be, signals associated with the multi-mode fiber and the single mode fiber. The signals can be multiplexed and/or demultiplexed before or after reaching the dual-core FORJ 200, depending on whether the signals are traveling downhole or to one or more interrogators, which may process signals received from a downhole location and which may be located in circuitry located at the surface. In some examples, the multiplexer/demultiplexer 302 may comprise a three-port device with one SM port, one MM port and a third port for the non-rotating dual-core fiber 100A. Additionally, the multiplexer/demultiplexor 302 may be bi-directional to allow for communication to and from a downhole location. Furthermore, though FIG. 3 illustrates the non-rotating stator portion located at the side of the FORJ 200 closest the multiplexor/demultiplexor 302, the FORJ may be rotated such that the non-rotating stator faces downhole and houses a non-rotating downhole dual-core cable.

Figure 4:
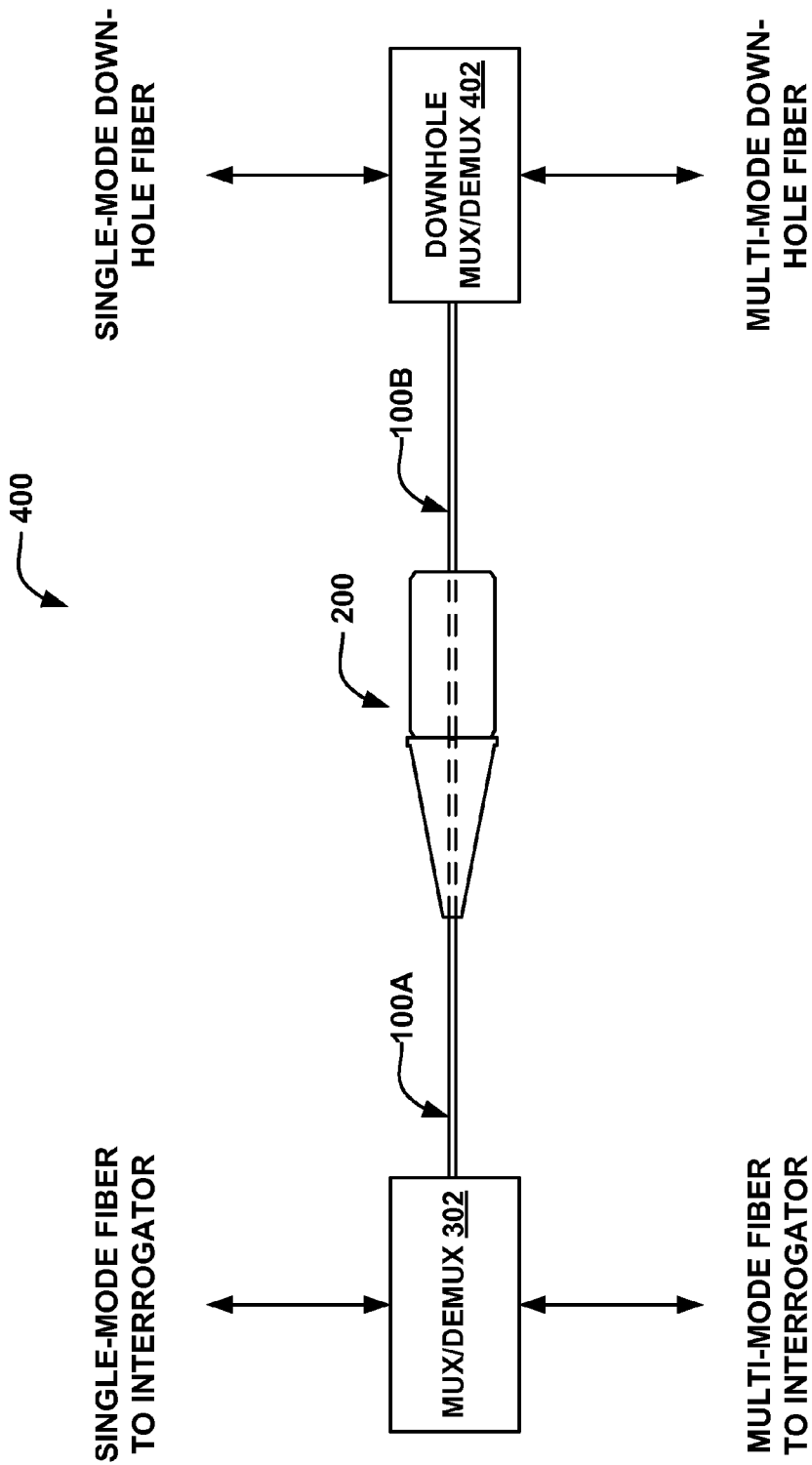
FIG. 4 depicts an alternative example of a system utilizing a fiber optic rotary joint for dual-core fibers.

FIG. 4 illustrates another example fiber optic communication system 400, which, in some examples, may be applied in downhole tool sensing and feedback systems. Fiber optic communication system 400 may be similar to fiber optic communication system 300, but may include one or more additional downhole multiplexors/demultiplexors 402 at a downhole location. Such an arrangement allows for fiber optic system monitoring for downhole systems that utilize both single mode and multi-mode fibers. The downhole multiplexor/demultiplexor 402 may comprise a three-port device with one SM port, one MM port and a third port for the rotating dual-core fiber 100B positioned downhole. Additionally, the downhole multiplexer/demultiplexor 402 may be bi-directional to allow for communication to and from a downhole location. Furthermore, though FIG. 4 illustrates the non-rotating stator portion located at the side of the FORJ 200 closest the multiplexor/demultiplexor 302, the FORJ may be rotated such that the non-rotating stator portion faces downhole multiplexor/demultiplexor 402.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A fiber optic rotary joint, comprising:
 a stator housing a non-rotating first dual-core fiber optic cable;

a rotor housing a rotating second dual-core fiber optic cable; and an alignment mechanism comprising a pair of lenses adjustable to align light beams between the first dual-core fiber optic cable and the second dual-core fiber optic cable, wherein the rotor is mounted to the stator to allow rotation of at least a portion of the rotor about at least a portion of the stator while facilitating optical communication between the first and second dual core fiber optic cables.

2. The fiber optic rotary joint of claim 1, wherein each dual-core fiber optic cable comprises an inner core disposed radially within an outer core.

3. The fiber optic rotary joint of claim 2, wherein the inner core of each dual-core fiber optic cable comprises a single mode core and the outer core comprises a multi-mode core.

4. The fiber optic rotary joint of claim 2, wherein the inner core of each dual-core fiber optic cable has a radius of distance a and the outer core has an inner radius of distance a and an outer radius of distance b.

5. The fiber optic rotary joint of claim 1, wherein the rotor is connected to the stator via one or more bearings.

6. The fiber optic rotary joint of claim 1, wherein at least one of lenses in the pair of lenses is selected from the group consisting essentially of a rod lens, a grated-index rod lens, an aspheric lens, a spherical lens, an expanded-beam lens, or a combination of any two or more of such lenses.

* * * * *